United States Patent [19]

van der Lely

[11] 4,095,653

[45] Jun. 20, 1978

[54] SOIL CULTIVATING IMPLEMENTS

[76] Inventor: Cornelis van der Lely, 7 Brüschenrain, Zug, Switzerland

[21] Appl. No.: 709,927

[22] Filed: Jul. 29, 1976

[30] Foreign Application Priority Data

Jul. 29, 1975 Netherlands .......................... 7509003

[51] Int. Cl.² ............................................. A01B 49/02
[52] U.S. Cl. .................................. 172/177; 172/179; 172/421; 172/451; 172/690; 172/694
[58] Field of Search ...................... 172/43, 59, 68, 176, 172/179, 196, 685, 689, 690, 693, 694, 695, 177, 421, 451

[56] References Cited

U.S. PATENT DOCUMENTS

| 191,043 | 5/1877 | Furman | 172/685 |
|---|---|---|---|
| 503,145 | 8/1893 | Killefer | 172/689 X |
| 1,933,906 | 11/1933 | Hendricks | 172/677 X |
| 2,808,772 | 10/1957 | Mabe | 172/690 X |
| 3,052,307 | 9/1962 | Kirschmann | 172/693 X |
| 3,275,341 | 9/1966 | Ralston | 172/677 X |
| 3,450,212 | 6/1969 | Sylvester | 172/690 X |
| 3,616,862 | 11/1971 | van der Lely | 172/68 X |
| 3,714,992 | 2/1973 | Meier | 172/196 X |
| 3,945,441 | 3/1976 | van der Lely et al. | 172/43 |
| 4,006,781 | 2/1977 | van der Lely et al. | 172/68 X |

FOREIGN PATENT DOCUMENTS

| 1,192,879 | 4/1959 | France | 172/690 |
|---|---|---|---|

Primary Examiner—Richard T. Stouffer
Attorney, Agent, or Firm—Mason, Mason & Albright

[57] ABSTRACT

An implement has a frame including beams assembled end to end in the shape of a W with deep tillage members depending from each beam. A towing hitch is connected to the middle of the assembly so that during operation, the beams are inclined with respect to the towing direction and the tillage members can plow deep. An elongated crumbler roller supports the rear of the frame and front ground wheels adjacent the frame sides support the front of the implement.

7 Claims, 4 Drawing Figures

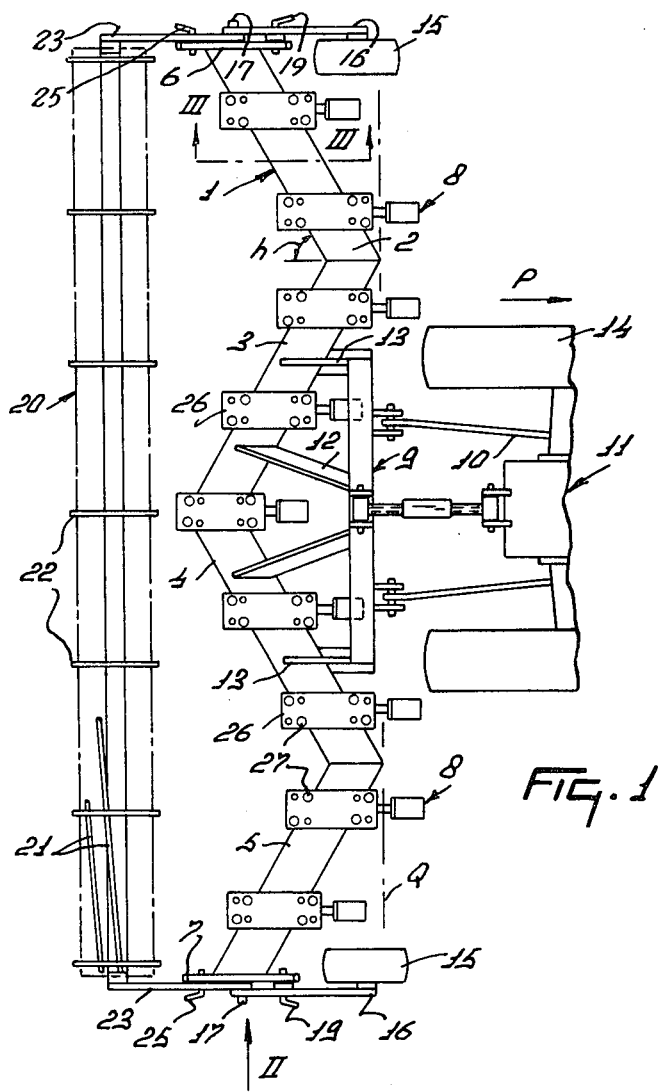
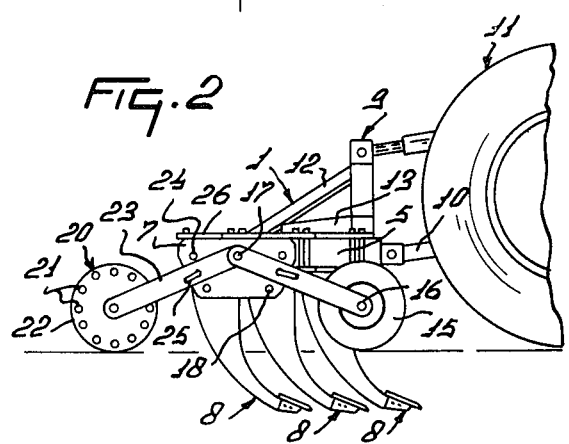

SOIL CULTIVATING IMPLEMENTS

This invention relates to soil cultivating implements, more particularly deep-tillage ploughs.

According to the present invention there is provided a soil cultivating implement comprising a substantially-horizontally extending frame that is W-shaped as viewed in plan, a plurality of soil cultivating members fastened to the frame and extending downwardly therefrom, and a towing hitch connected to the frame and arranged substantially near the middle of the frame.

For a better understanding of the invention and to show how the same may be carried into effect, reference will now be made, by way of example, to the accompanying drawings, in which:

FIG. 1 is a plan view of a soil cultivating implement having a frame constructed in the form of a W as viewed in plan and with respect to the intended direction of operative travel of the implement.

FIG. 2 is a side view taken in the direction of the arrow II in FIG. 1,

Figure 3:
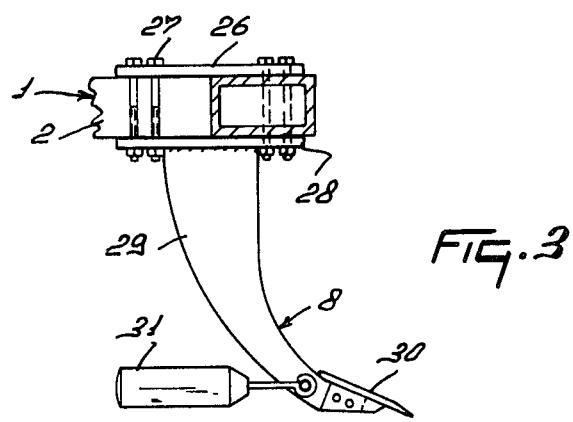
FIG. 3 is a sectional side view taken on the line III—III in FIG. 1 and showing a cultivating member of the implement provided with an element for digging drainage channels and FIG. 4 is a plan view of a second form of cultivating implement having a frame constructed in the form of an inverted W, as viewed in plan and with respect to the intended direction of operative travel of the implement.

The soil cultivating implement shown in FIGS. 1 to 3 is a deep-tillage plough, the frame 1 of which is made-up of four frame beams 2, 3, 4 and 5 disposed in the form of a W as viewed in plan and with respect to the intended direction of operative travel of the implement, that is the ploughing direction P. Thus the frame beams are all at an acute angle h to the ploughing direction P with the angle between each of the frame beams and the ploughing direction P preferably the same but oppositely directed for each two neighbouring frame beams. The angle h is larger than 45° and in the form illustrated is about 60°.

The frame beams 2, 3, 4 and 5 have all the same length, preferably of about 1 meter. At the outer ends of the outer beams 2 and 5 there are plates 6 and 7. The frame beams 2 to 5 are provided with a plurality of soil cultivating members 8 — in the form illustrated nine — with each frame beam holding two cultivating members intermediate its ends, and there being an additional cultivating member at the center of the implement at the junction between the frame beams 3 and 4. The cultivating members are intended for deep ploughing and are preferably spaced apart be equal distances. The connection of the cultivating members to the beams 2, 3, 4 and 5 intermediate the ends of these beams has the advantage that they can be firmly secured in place. Moreover, the members are then not located too far to the rear of the implement. This construction furthermore permits of arranging the cultivating members at the desired distance without the beams becoming too short, which would be the case if the cultivating members were all arranged at the ends of the beams.

The frame 1 is provided with a hitch 9 by means of which the implement can be coupled with the three-point lift 10 of a tractor 11. The hitch is provided in known manner with coupling points for the three-point lift 10 and has two rearwardly inclined supports 12, by which the hitch 9 is secured to the beams 3 and 4. The hitch 9 is furthermore secured to the frame beams 3 and 4 by means of plates 13. The hitch 9 is located, viewed on plan, near a vertical plane Q that is transverse of the ploughing direction P and contains the foremost tips of the junctions of the frame beams 2 and 3 and 4 and 5. The plane Q is located closely behind the rear wheels 14 of the tractor 11.

The implement has two ground wheels 15 having a common axis of rotation that is located near the plane Q viewed on plan. The ground wheels 15 are supported, by means of arms 16, from the plates 6 and 7 and are capable of turning about the coupling points 17 of the arms 16 to the plates 6 and 7. They are adjustable in a direction of height. For this purpose the plates 6 and 7 each have a plurality of holes 18 and each arm 16 has a corresponding hole so that by means of a locking pin 19 passed through the arm hole and a selected one of the holes 18 each arm 16 can be set in a selected one of several different positions. The ground wheels 15 are located, viewed on plan, within the sides of the frame 1.

Behind the frame 1 a crumbler roller 20 of a diameter of about 35 cms. is provided. This crumbling roller has a plurality of helically extending bars 21 that are extending transverse of the ploughing direction P and are held by a plurality of supporting plates 22 extending in the ploughing direction P. The outermost right-hand tip of each bar 21, viewed in the ploughing direction P, is turned through about 90° with respect to the outermost left-hand tip of this bar, viewed in the same direction. The crumbler roller 20 is fastened by means of two arms 23 to the plates 6 and 7 at the same coupling points 17 as the arms 16. The crumbler roller 20 is adjustable in a direction of height about the coupling point 17, for which purpose the side plates have a plurality of holes 24 with any one of which a hole in the adjacent arm 23 can be brought into registry so that by means of a locking pin 25 the roller can be fixed in any selected one of several different positions.

The cultivating members 8, as is shown in FIG. 3, have at their upper end plates 28 that are clamped to the lower faces of frame beams 2 to 5 by bolts 27 passed through plates 26 located above the frame beams 2 to 5 and through the plates 28, the bolt holes in the plates 26 and 28 for these bolts 27 being parallel to the sides of the frame beams. From the plates 28 ploughing bodies 29 of the cultivating member 8 extend downwardly to plough shares 30 at their lower ends. Since the sides of the frame beams 2 to 5 extend obliquely to the ploughing direction P in opposite senses, it is advantageous to provide in each of the plates 26 and 28 four bolt holes so that the ploughing bodies can be selectively fastened to any one of the frame beams utilising, for each ploughing body, four bolts two of which lie along the leading face of the selected frame beam and the other two of which lie along the trailing face of this beam. The fastening of the plough bodies to the frame beams is illustrated in FIG. 3. From this Figure it is furthermore apparent that, if desired, the frame beams 2, 3, 4 and 5 may be hollow beams.

It will be apparent that the ploughing bodies can plough to a great depth. With this in mind, each ploughing body can be provided with an element 31 for digging a drainage channel, but these elements can, of course, be omitted.

In operation the soil cultivating implement is drawn by the tractor 11 in the direction of the arrow P. The ploughing bodies 29 penetrate into the soil and tear the soil up to a great depth. Heavy forces are exerted on the implement, since the ploughing bodies are drawn across the soil at a comparatively great depth. The particular frame structure that has been described, in which the base of the W-shaped frame is the front of the frame with respect to the ploughing direction P, provides that the implement can be mounted fairly closely behind the tractor, and yet rows of ploughing bodies that are inclined to the direction of ploughing are obtained. The latter is desirable because the energy required for moving the soil cultivating implement is thus minimised. Although the cultivating members are located on lines inclined to the ploughing direction, the structure ensures that any inaccuracy in steering does not appreciably affect the ploughing effect because of the frame structure. The particular position of the hitch on the frame contributes to the factor just discussed. It is furthermore important that the frame beams 2 to 5 have a limited length of, for example, 1 meter.

The crumbler roller 20 serves for crumbling the top layer of the soil and obtaining a uniform distribution of the top layer. The ground wheels 15, which are located within the largest width of the frame 1, effectively support the implement, since viewed from the side, they are located approximately beneath the coupling point of the tractor lift with the implement.

Figure 4:
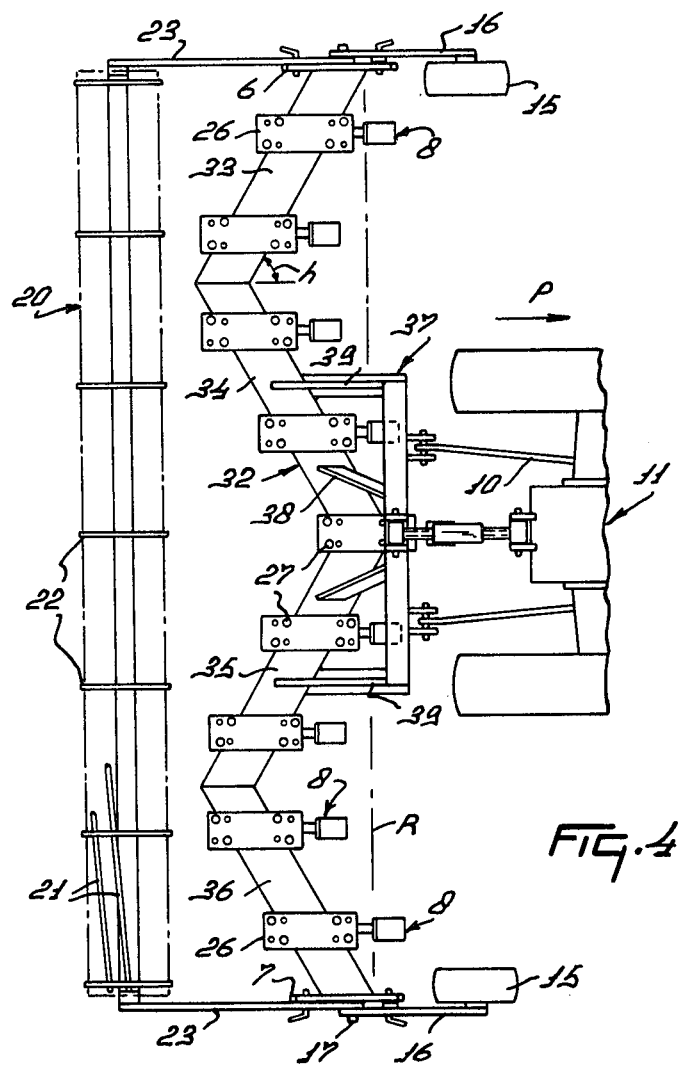

In the embodiment shown in FIG. 4 component parts corresponding with those shown in FIGS. 1, 2 and 3 are designated by the same reference numerals. In this case the frame 32 of the implement is inverted, with respect to the ploughing direction P, as compared with the implement of FIGS. 1 to 3, so that an inverted W is obtained (that is the base of the W-shaped frame is at the rear of the frame with respect to the ploughing direction P). The frame 32 is made-up of four frame beams 33, 34, 35 and 36. As in the form of FIG. 1 these frame beams are at an angle $h$ to the ploughing direction P and each of these frame beams carries two cultivating members 8, while an additional cultivating member is provided at the centre of the implement. The implement has a hitch 37 for attachment to the lifting device 10 of a tractor 11. The hitch 37 is located near an upright plane R transverse of the ploughing direction P and containing the tip of the joint between the frame beams 34 and 35, and the leading tips of the outer ends of the frame beams 33 and 36. The hitch 37 is secured by means of two struts 38 and side plates 39 to the frame beams 34 and 35 respectively.

The implement also has a crumbler roller 20 which is fastened to the frame 32 in the manner described with reference to FIGS. 1 and 2. The implement has furthermore ground wheels 15, also secured in the manner described for FIGS. 1 and 2.

The implement of FIG. 4 operates in the same favourable manner as described above with reference to FIGS. 1 to 3, although the implement of FIGS. 1 to 3 may be arranged slightly more closely to the tractor than the implement of FIG. 4. The implement of FIGS. 1 to 3 can be mounted so that two of the cultivating members 8 are disposed so that they tear up strips of soil located immediately adjacent the outer sides of the tractor tires, thereby minimising the problems that might otherwise arise in lifting such a closely attached implement by means of the three-point lift.

It will be apparent that the implement of FIG. 4, as in the case of that of FIGS. 1 to 3, may be employed not only for deep tillage but also for draining the soil.

While various features of the soil cultivating implements that have been described, and that are illustrated in the drawings, will be set forth in the following claims as inventive features, it is to be noted that the invention is not necessarily limited to these features and that it encompasses all of the features that have been described both individually and in various combinations.

What I claim is:

1. A soil cultivating implement connectable to a multiple point lifting hitch of a tractor, comprising a frame having elongated frame beams assembled end to end at junctures that define a substantially W-shape, when viewed in plan, the assembly including outermost beams and interior beams that extend generally horizontal and transverse to the direction of travel and each beam extending at an oblique angle to the direction of travel, said beam mounting two spaced apart deep tillage members that depend therefrom and said tillage members being fixed to said beam intermediate the ends thereof, a multiple point coupling hitch having laterally extending arms with coupling points and said hitch being fastened to substantially the mid-point of the assembly by plate means and support means, said plate means and support means extending upwardly and forwardly from connections on said interior beams to further connections on said arms, said further connections being spaced from said coupling points, said hitch being located adjacent a vertical plane that extends transverse to the direction of machine travel and said plane containing the foremost tips of alternate junctions of the beams, said outermost beams being positioned laterally of said hitch.

2. A soil cultivating implement as claimed in claim 1, wherein the base of the W-shaped beam assembly is the front of the frame with respect to the normal direction of operative travel of the implement.

3. A soil cultivating implement as claimed in claim 1, wherein said beams each extend at an angle to the direction of travel and said angle exceeds 45°.

4. A soil cultivating implement as claimed in claim 1, wherein said tillage members each comprise drainage channel digging means.

5. A soil cultivating inplement as claimed in claim 1, wherein a supporting roller is connected to the assembly by arms and means on said arms adjusting the relative vertical position of said roller to said assembly.

6. A soil cultivating implement as claimed in claim 5, wherein supporting ground wheels are connected at the sides of said beam assembly and in front of said tillage members, said wheels being located near the vertical plane that extends transverse to the direction of travel and contains the foremost tips of the alternate junctions of said beams.

7. A soil cultivating implement as claimed in claim 6, wherein said wheels are connected to said assembly by adjustable arms and vertically movable about pivots relative to said frame, a respective adjustable arm being pivoted to each side of the assembly, the pivotal axis for the adjustable arm of each ground wheel coinciding with the pivot axis of the arm supporting said roller.

* * * * *